US006644235B2

(12) United States Patent
Haynes

(10) Patent No.: US 6,644,235 B2
(45) Date of Patent: Nov. 11, 2003

(54) SLIDE OUT GUIDE

(76) Inventor: John P. Haynes, 10353 Milwood Ave., Chatsworth, CA (US) 91311

( * ) Notice: Subject to any disclaimer, the term of this patent is extended or adjusted under 35 U.S.C. 154(b) by 0 days.

(21) Appl. No.: 10/274,584

(22) Filed: Oct. 21, 2002

(65) Prior Publication Data

US 2003/0089296 A1 May 15, 2003

Related U.S. Application Data

(60) Provisional application No. 60/339,016, filed on Nov. 13, 2001.

(51) Int. Cl.[7] ............................................. E01D 21/00
(52) U.S. Cl. ..................... 116/28 R; 116/209
(58) Field of Search ....................... 116/28 R, 35 R, 116/209; 33/264; 280/477

(56) References Cited

U.S. PATENT DOCUMENTS

| | | | | |
|---|---|---|---|---|
| 3,611,286 A | * | 10/1971 | Cleveland | ................... 340/436 |
| 3,788,268 A | * | 1/1974 | Hiatt et al. | ................ 116/28 R |
| 3,972,302 A | * | 8/1976 | Sherman | .................... 166/28 R |
| 4,257,706 A | * | 3/1981 | Smith | ........................ 116/28 R |
| 4,586,454 A | * | 5/1986 | Hedquist et al. | ........... 116/28 R |
| 4,825,192 A | * | 4/1989 | Wells | ............................ 116/32 |
| 5,038,136 A | * | 8/1991 | Watson | ........................ 340/433 |
| 5,355,117 A | * | 10/1994 | Jefferson | ..................... 340/433 |
| 5,617,072 A | * | 4/1997 | McNeal | ....................... 340/431 |
| 5,847,642 A | * | 12/1998 | Esposito et al. | ............. 340/433 |
| 6,079,114 A | * | 6/2000 | Toews | .......................... 33/264 |
| 6,213,047 B1 | * | 4/2001 | Means et al. | ............. 116/28 R |
| 6,338,523 B1 | * | 1/2002 | Rasmussen | ................. 296/175 |

* cited by examiner

Primary Examiner—Christopher W. Fulton
Assistant Examiner—Travis Reis

(57) ABSTRACT

A positioning and parking guide for a recreational vehicle (10), consisting of two, or more power-driven telescoping rods (12), extended to provide a visual horizontal and vertical frame of reference (33), in determining the distance required to avoid any fixed object, or to not exceed any boundary, when parking such unit within a campsite or other parking space, after slide out rooms are extended.

1 Claim, 4 Drawing Sheets

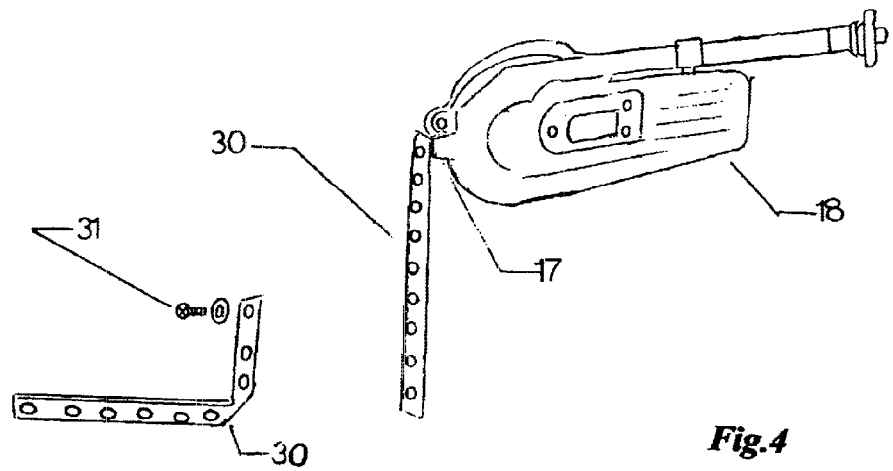
Fig. 4
Fig. 4a
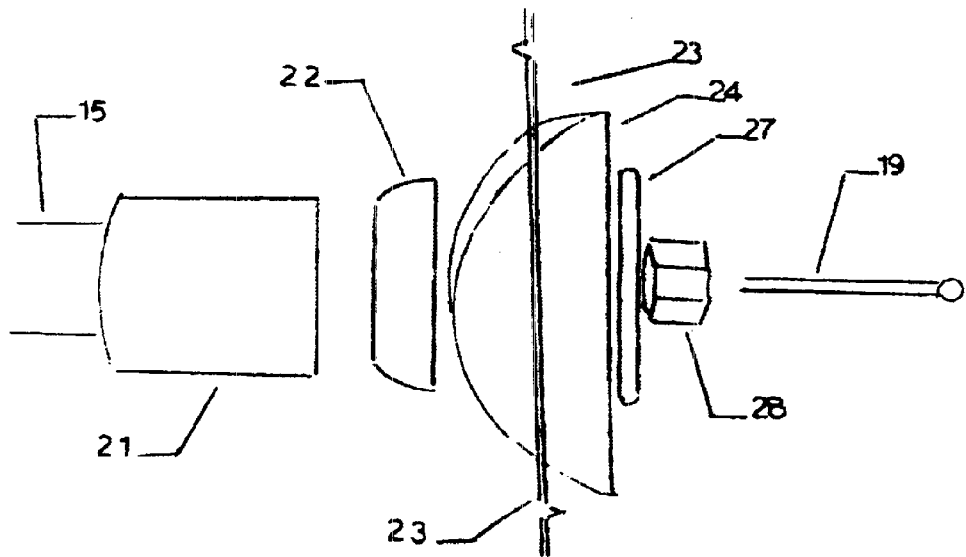
Fig. 5a

SLIDE OUT GUIDE

CROSS-REFERENCE TO RELATED APPLICATION

This application claims the benefit of Provisional Patent Application Ser. No. 60/339,016, filed Nov. 13, 2001.

FEDERALLY SPONSORED RESEARCH

Not Applicable

SEQUENCE LISTING OF PROGRAM

Not applicable

BACKGROUND

1. Field of Invention

This invention relates to a novel and useful visual guide, for the benefit of a driver, in the positioning and parking of a recreational type vehicle in a campsite or any other confined parking space.

2. Description of Prior Art

Background:

In the mid 1990's, manufacturers of Recreational Vehicles (RVs), such as motor homes, fifth wheel and other pull type trailers, introduced a new optional feature, called "slide out rooms". Slide out rooms are not actually separate rooms, but are an extension of the interior space within the RV created when a portion of the outside wall is mechanically extended outward. The slide out rooms usually extend two to four feet and result in the space inside the RV being increased.

Over 500,000 recreation vehicles were sold in 2002. Slide out rooms became so popular that over 80% of such RVs included one, or more on either, or both sides of the unit. In the future, it is estimated that virtually all RV units will have a minimum of at least one slide out room.

The Problem:

When the RV is being driven or pulled along the highway, the slide out rooms are retracted and the unit is of normal road width. Slide out rooms are only extended when the RV is stationary, for example, while parked in a campsite. Herein lies the problem! With the addition of slide out rooms, once extended, the RV requires a larger space, while most campsites and other parking spaces have remained the same size. Some private campgrounds have enlarged their sites, however most public state and federal campgrounds have not. Many are located in parks or other heavily wooded areas, which often makes accommodating RV's with slide out rooms quite difficult.

Positioning and parking a RV with slide out rooms requires the owner/operator to have a greater degree of skill, time and patience. To accommodate the extra width of a RV unit with slide out rooms, the additional space, which the extended room will occupy, must be measured, or calculated. After arriving at the parking site, the driver must position and reposition the unit, requiring repeated and frequent trips outside the RV and/or the help of an assistant to give maneuvering directions. A high degree of caution must be taken to insure that no fixed obstruction(s) are present, which would interfere or cause damage to the room when it is extended.

The Solution:

This invention provides the driver of a RV unit, that is equipped with slide out rooms, a visual device to assist in positioning and parking, without ever getting out of the unit. Much less skill, time and patience is required and parking the RV becomes less difficult.

The Slide Out Guide involves the use of a pair of power-driven telescoping antennas, capable of being extended and retracted. Activation is by either a switch located within easy reach of the driver's seat, or by a remote control device. Installation and use of this invention is fully described and supported, in the following Drawings, Detailed Specifications and Claims contained in this application and represents the use and modification of Prior Art in a new and novel way.

PRIOR ART

Parking Guides:

There have been many devices created and patented as aides in the parking and operation of automobiles, but none were found for specific use with RVs. U.S. Pat. No. 6,345,587, Toscano (2002) involves the use of manually operated telescoping antennas attached to the license plate holder of an automobile. This is used as a visual guide to locate the front end of the vehicle, which is not the use or objective of this invention. U.S. Pat. No. 3,998,285, Cooper (1976) and U.S. Pat. No. 3,563,200, Grossman (1971) refer to a parking guide mechanism attached to the rear bumper of an automobile, to assist in judging the relative position of the bumper to any fixed object, while backing. Again, this type of device would not solve the problem of visually measuring a pre-determined distance from the side of a vehicle and could not be permanently installed on the side of a RV, as it would interfere with traffic while being driven or towed. U.S. Pat. No. 5,894,673, Pretsch (1999), U.S. Pat. No. 5,655,306, Pretsch (1997) and U.S. Pat. No. 3,137,267, Hurt (1964) all relate to devices and objects permanently attached to trucks or trailer-tractors for judging distance by contact, or touching another object, such as a loading dock or overhead obstruction.

The object of this invention is to visually measure a clear space for subsequent extension of the slide out room(s) and to avoid contact with another object. Many items of prior art found under the general classification of "parking guides" relate to positioning and parking a vehicle in a garage or other enclosed structure, including U.S. Pat. No. 6,199,287, Rankila (2001), U.S. Pat. No. 5,832,865, Harmel (1998), U.S. Pat. No. 4,036,165, Wood (1977), U.S. Pat. No. 5,507,245, Kennedy (1996), U.S. Pat. No. 5,230,296, Giltz, etal. (1993), U.S. Pat. No. 4,813,758, Sanders (1989), U.S. Pat. No. 4,101,868, Bubnich, etal. (1978), U.S. Pat. No. 3,793,981, Sparks (1974), U.S. Pat. No. 2,731,934, Hausmann, etal. (1956) and U.S. Pat. No. 1,981,188, Pavitt (1934). Each is a visual aide, however all require that a device or object be fixed to a garage or other structure to work in conjunction with the automobile. Parking a recreational vehicle within a campsite, or other open parking space can not depend on a fixed object attached to a structure. The aide must be totally self-contained within the RV. This invention meets that requirement and is available whenever and wherever use is desired.

Finally, U.S. Pat. No. 2,871,814, Stahl (1959), U.S. Pat. No. 2,753,439, Greenfield (1956) and U.S. Pat. No. 2,672,841, Nitzberg (1954) all cover fender guides for attachment to automobile headlight housings to assist drivers in the visual location of such fenders in parking situations. They have no relationship, nor offer any assistance, in visually measuring a horizontal and vertical reference point for clearance purposes, as does the subject invention in this application.

In summary of prior art in the area of parking guides, we could find no device or method, nor solution to the problem of positioning and parking a recreational vehicle, with or without slide out rooms, in a campsite or other open confined space.

Power-Driven Telescoping Antenna Units and Antennas:

The other prior art utilized with this invention is an electrically powered telescoping antenna device, capable of extending and retracting an antenna (hereinafter referred to as a telescoping "rod"), as used in this application. While all referenced prior art we cite herein is designed for the specific purpose of receiving radio reception while installed in a vertical position, it can, with modification, work in a horizontal position, as a measuring device. This, however, would be considered unobvious, when installed and used for the purpose of this invention. Also, the construction of all prior art in the area of power-driven telescoping rods and antennas for use therewith, contemplates the use of conductive materials capable of radio wave reception. This invention can utilize any non-conductive material in construction of the telescoping rod, as long as it is of sufficient strength to maintain a reasonably straight horizontal line, when fully extended. In addition, this invention does not require a cable connection from the rod to a radio.

U.S. Pat. No. 6,107,969, Gulino etal. (2000), U.S. Pat. No. 5,929,826, Shinkawa etal. (1999), U.S. Pat. No. 5,201,391, Arai etal. (1993), U.S. Pat. No. 4,875,053, Harada (1989), U.S. Pat. No. 4,829,317, Shinkawa (1989), U.S. Pat. No. 4,742,360, Carolus etal. (1988), U.S. Pat. No. 4,542,383, Cusey etal. (1985) and U.S. Pat. No. 4,303,872, Alf etal. (1981) represent several of the most recent automobile power antennas fully equipped with a motor, clutch, drive and telescoping antenna. All are designed for use in a vertical position and for radio wave reception.

U.S. Pat. No. 6,046,706, Vargas (2000), U.S. Pat. No. 6,002,378, Harada, etal. (1999), U.S. Pat. No. 5,959,593, Hoshi (1999), U.S. Pat. No. 5,900,846, Phelps (1999), U.S. Pat. No. 5,835,070, Scaraglino (1998), U.S. Pat. No. 4,717,923, Kimura (1988) and U.S. Pat. No. 4,633,266, Alf etal. (1986) represent only a few recently developed telescoping antenna rods and only differ in design, components and construction. Again, each is intended for vertical use, with radio wave reception capabilities and not as horizontal measuring device.

In summary, while many prior art devices have been introduced to the public, a few of which have been listed above, there have been no previous indication that such art could also be used as suggested by this invention. By modification of prior art, as explained in detail herein, this invention becomes a novel and useful device and unobvious before this time.

Objects and Advantages:

Accordingly, the objects and advantages of this power-driven telescoping rod measuring device, described above as my invention, would include the following:

(a) With only minor modifications as outlined herein, any standard power-driven telescoping rod could be used, thus drastically reducing the cost of this invention. When compared to the cost of repairing a slide out room, damaged during extension if it comes in contact with a solid object, this invention becomes very financially attractive.

(b) Provides a simple, yet important, means for visually measuring the space necessary to fully extend slide out room(s), in positioning and parking a RV unit in a confined campsite, or other parking space.

(c) Offers a manual switch or remote control activation from the driver's seat of a motor home or towing vehicle.

(d) Provides the ability to view telescoping rod tips in the driver's rearview mirrors while positing the RV unit, thus eliminating the need for frequent trips outside the vehicle, or use of an assistant.

(e) Bright colored telescoping sections and rod help separate the rod from background clutter, such as gravel, rocks, brush, etc.

SUMMARY

This invention is the first product to be offered as a visual measuring device to RV owners to assist in positioning and parking their units in either tight and cramped campsites, or other confined parking spaces. It can be supplied at a reasonable cost. It is easily installed. Installation can be performed by a manufacturer, or by owners of RV's already in use, as an after-market product. It will be a great help for both first time RV buyers, or those less skilled in backing, positioning and parking of their units, making their RV experience much more enjoyable.

DRAWINGS

The best method and mode presently contemplated for utilizing this invention in actual practice is shown in the accompanying drawings, in which.

FIG. 4 denotes the manner in which the end of the main power unit body is secured to the RV for stability during travel and operation.

FIG. 5 illustrates the various components at the base of the telescoping rod, which secures it to the outer body wall of the recreational vehicle.

Figure 6:
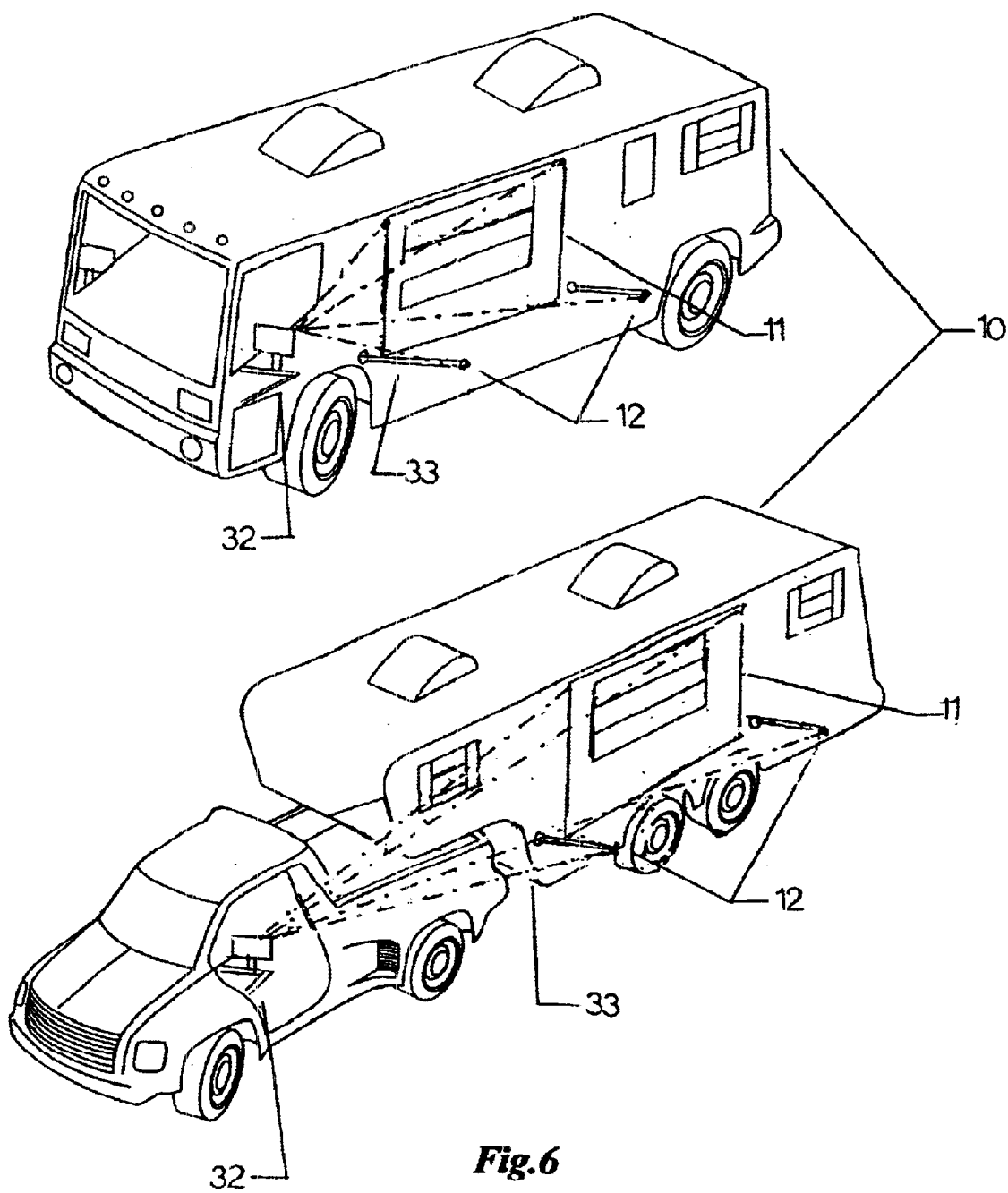

FIG. 6 indicates the driver's projected sight lines, to form a visual frame of reference for proper clearance.

REFERENCE NUMBERS IN DRAWINGS 10 two types of recreational vehicles
11 position of extended slide out rooms
11 telescoping rods
14 tip of telescoping rod
15 hollow neck holding rod when retracted
16 electrical wires
17 rear mounting insert
18 main body of unit
19 end section of telescoping rod
20 mounting assembly
21 spacing sleeve
22 ground washer
23 outside wall of recreational vehicle
24 mounting retainer and seal
27 light seal 28 mounting nut
30 metal strap
31 machine screw and lock washer
32 rearview mirrors
33 sight lines

DETAILED DESCRIPTION OF PREFERRED EMBODIMENTS

Figure 1:
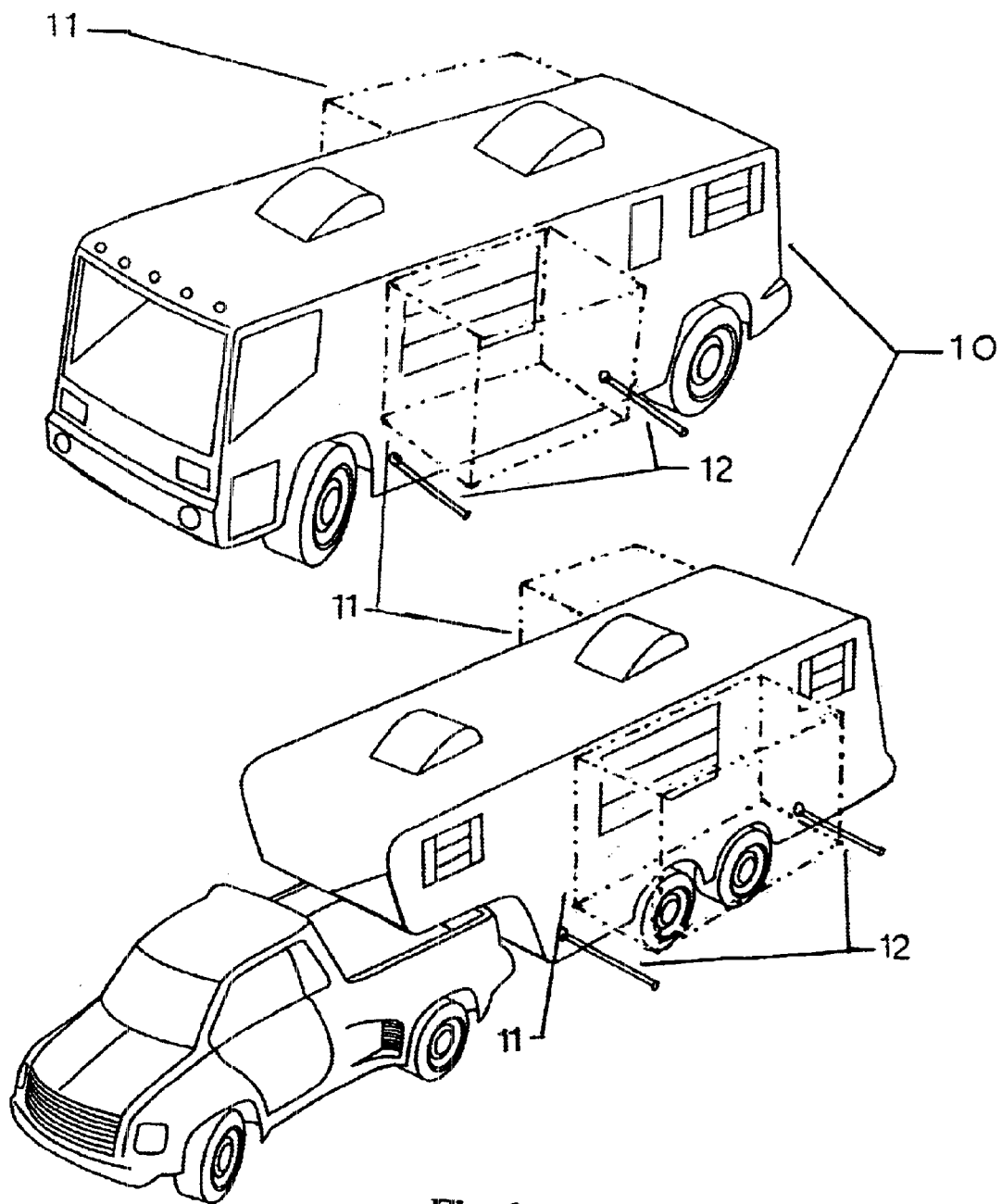
FIG. 1 is a perspective view of the preferable location(s) of the telescoping antennas, hereinafter referred to as telescoping rods, in their extended positions, for a recreational vehicle application, with said vehicle having, in a phantom view, one or more slide out rooms, as illustrated.

Referring to FIG. 1 indicates where the telescoping rods 12, should be mounted on the RV Preferably they should be located within an interior space of the vehicle body 10, under the interior flooring, either within a storage compartment, or between the outside wall of said RV and its main longitudinal steel frame.

Proper and preferable location of the invention on the vehicle 10 is very important to achieve maximum benefit in its use as a visual device. One must determine optimum positioning to assure proper clearance for slide out room(s) 11 from any obstructions when it, or they, are extended. The preferred location of said telescoping rods 12 would be on each side of the slide out room(s) 11, just to the side thereof and slightly below the bottom of said slide out room(s) 11. When fully extended, said telescoping rods 12, will provide a visual sight line horizontally between the outer most point, or tip, of each rod. Also, said telescoping rods 12 will provide a vertical view from said rod 12 tips to the top of said slide out room(s) 11, to assure that no obstructions fall within the visual frame thus achieved. Such visual frame, when clear of any obstructions, will assure that the slide out room(s) 11 will not be damaged when extended.

Use of Prior Art

Figure 2:
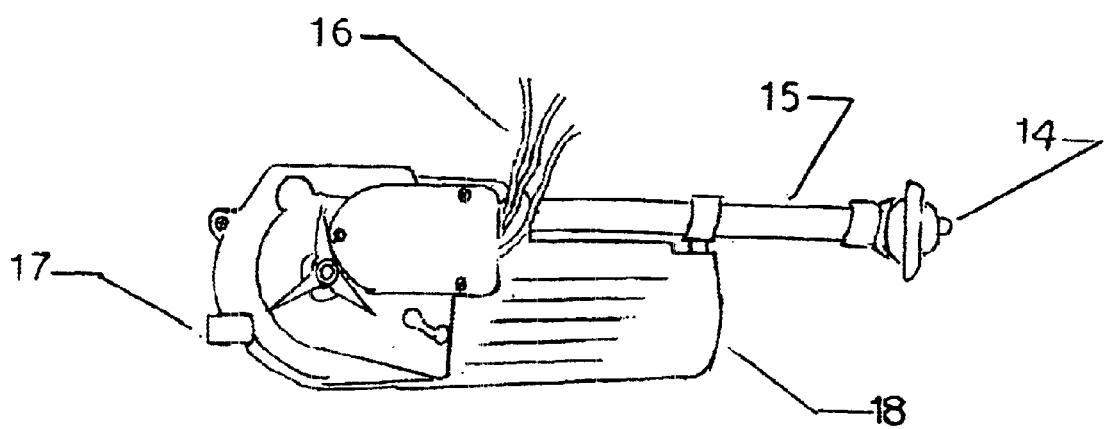
FIG. 2 is a view of a typical auto power-telescoping rod, disclosed as Prior Art elsewhere in this application, with preferred modifications.

Referring now to FIG. 2, as shown, the main embodiment of this invention is the novel, unobvious and new use of Prior Art, as referred to and outlined elsewhere in this application. It is the use of a 12 V DC power-driven telescoping antenna 12, hereinafter referred to as a telescoping "rod" 12, encased in a base unit 18 and utilized in a horizontal position, in lieu of a vertical position as originally designed. Said power-driven telescoping base unit device 18 of any make, or model may be used, with preferred modifications as herein outlined. The rear drain hole and attachable drain tube may be eliminated. Rain or moisture collecting in the base unit is not a problem when said unit is installed within the vehicle (10) in a horizontal position, as opposed to a typical vertical position.

Another modification is made to the motor and clutch drive assembly, in that the duration of time said motor is running, can be adjusted. This will allow for extension or retraction of various lengths of said telescoping rods 12, as may be desired, to accomplish the preferred use of the invention.

Additionally, the radio wave receptor cable, normally attached to the hollow neck housing tube 15, will preferably be removed from said neck 15, thus providing for greater ease of installation. Further, the material used in the construction of the telescoping rods 12 need not be of a conductive material, as radio wave reception is not required. Said telescoping rod 12 construction may be of any material, such as steel or a polyethylene plastic, which is sufficient to maintain a reasonable straight line, when extended horizontally to the desired length.

A rear-mounting insert 17 is provided to secure said base unit 18 to an inside support of the vehicle 10 as further explained in FIG. 4. Color-coded power and ground wires 16 are provided for connection of the base unit 18 to any DC power source, such as an onboard 12V battery. Installation can provide for activation of the telescoping rods 12, by use of either a switch, located on the outside of the vehicle 10, or inside thereof, within easy reach of the driver's seat of said vehicle 10. Further, activation can be by use of a remote control device, similar to those used as garage and auto door openers, with simple modifications.

The Measuring Device

Figure 3:
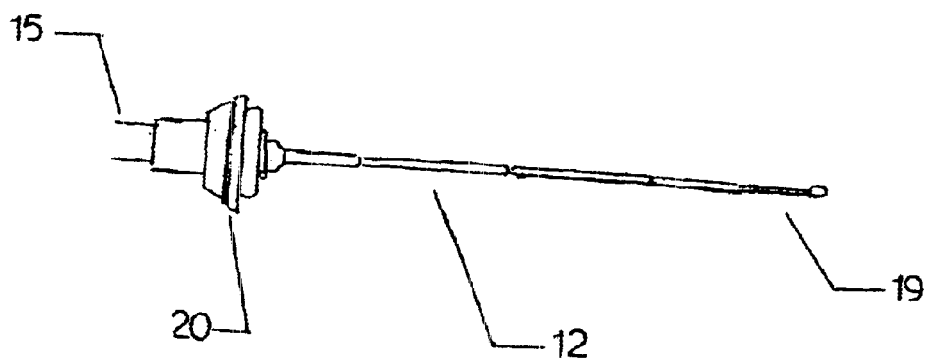
FIG. 3 depicts a telescoping rod, disclosed as Prior Art elsewhere in this application, with preferable modifications.

Regarding and referring to FIG. 3, the telescoping rod 12 is the heart of this invention, as it provides the means for measurement to determine proper clearance for extension of the vehicle's 10 slide out room(s) 12, without expensive damage thereto. The telescoping rod 12 preferably is modified to better perform as a measuring device, as outlined in this application. Said telescoping rod 12 can be made to any desired length by deletion or addition of telescoping sections, or by lengthening or shortening one or more sections. Likewise the hollow housing tube 15, can be made shorter or longer, as necessary to accommodate the length of the base section of the telescoping rod 12, when in a retracted position, in order that the tip of said rod 12 is flush with the outside mounting base 20.

Also, it is most preferable that the last, most extended section 19 of the telescoping rod 12 be painted a bright color, such as red, orange or yellow, to enhance visual observation from the driver's rear view mirrors, while said vehicle 10 is being positioned. Said colored section 19 will help distinguish said telescoping rods 12 from background clutter, such as gravel, grass, leaves, etc.

Mounting Unit to Vehicle

Referring now to FIG. 4, we describe and illustrate how the main body unit 18 is to be mounted inside of said vehicle 10 to provide stability during travel and subsequent operation of said telescoping rod 12. An inside threaded brass support insert 17 is molded to the rear of the main body unit 18. To this is attached a metal strap 30 having a plurality of holes, by use of a standard machine screw 31 using whichever hole is most convenient for proper installation. Metal strap 30 is then attached to any available wood or metal vehicle support member, brace, floor or underside of said vehicle's 10 upper flooring, by bending said metal strap 30 to any desired position as shown in FIG. 4a. Holes in said metal strap 30 are provided to accommodate various installation applications.

Mounting the Telescoping Rods

FIG. 5 provides, in exploded detail, the various mounting pieces to secure the telescoping rod 12 to the outside body 23 of the vehicle 10. A spacing sleeve 21, length of which is determined by each installation, is slipped onto the end of said telescoping rod 12 and butts up against the housing neck 15. A ground washer 22 is then slipped on the telescoping rod 12 next to said spacing sleeve 21. Thus arranged, the main body unit 18 is placed inside the vehicle 10 so that the outward tip of said rod 12 protrudes through a pre-cut hole in said vehicle's 10 outside wall 23. Then a mounting retainer 24 of rubber, plastic, or similar material, is slipped onto the telescoping rod 12 to form a weather seal. Next, a neon light ring 25, with electrodes 26, is installed, followed by a rubber insert 27 and then the mounting nut 19. Thus installed, a stable and aesthetic attachment to the vehicle is achieved.

Visual Frame of Reference

Finally, referring to FIG. 6, we illustrate the visual sight lines 33 achieved by use of said telescoping rods 12 and the driver's rearview mirrors 32 attached to said vehicle 10. Each pair of telescoping rods provide projected sight lines 33. They form a horizontal line between the tips of said telescoping rods 12 and also form a vertical line from the tips of said telescoping rods 12 to the top line of the slide out room(s) 11. In combination, this creates a visual estimation of the space the extended side out rooms will occupy. This space must be clear of any obstructions to prevent interference with the subsequent extension of the slide out room(s) 11.

Further, this visualization will assure that the extended slide out room(s) 11 will not extend beyond any boundary or line imposed by a private or public body.

While the invention has been described in connection with what is presently considered to be the most practical and preferred embodiments, it is to be understood that it's application is not to be limited to the disclosed embodiments, but on the contrary, is intended to cover various modifications and equivalent arrangements included within the spirit and scope of the appended claims.

I claim:

1. A device for visually measuring and predetermining the area that would be required for a motor home type recreational vehicle slide out room, prior to said room's extension, comprising:
   a. two power driven telescoping rod assemblies, each assembly electronically extending and retracting a telescoping rod, attached to the side wall of a motor home type recreational vehicle, on each side of and adjacent to, at, or near the bottom edge of the slide out room;
   b. said telescoping rod assemblies being attached in such a manner as to provide for extension and retraction of said rods in a horizontal line position to a predetermined distance, while said recreational vehicle is being positioned for parking;
   c. each of said telescoping rods comprising at least two sections of predetermined length, a first section attached to the sidewall of said recreational vehicle, and an end section, which extends the farthest when said telescoping rods are fully extended, said end section being made of a solid material, said first section having a progressively larger diameter and being hollow in such a manner as to receive the end section in a collapsing fashion;
   d. said first section of each said telescoping rod comprised of a material of sufficient strength to maintain a relative straight horizontal line while extended;
   e. a drive mechanism attached to a first end of each of said first sections which drives the respective end sections of the rods outward and away when each said telescoping rod is extended and pulls the end said sections inwards in a collapsing fashion when being retracted;
   f. said power-driven telescoping rod assemblies being installed within the interior of said recreational vehicle so that the outer most tip of the end section of each said telescoping rod is flush with the outside wall of said recreational vehicle when in a retracted position, thus avoiding any interference with traffic, or obstacles, when parked, or traveling on a road or highway;
   g. said assemblies positioned on said recreational vehicle in such a manner as to be visible when in an extended position by a driver of the recreational vehicle in the driver's rearview mirrors while in a driver's seat, wherein
   h. when said assemblies are electrically activated by a switch mounted next to said driver's seat or by a remote control device, said telescoping rods extend to their full horizontal position from the side of said recreational vehicle, thereby said telescoping rods providing a means for a visual horizontal sight line between the outer most tips of the end sections of each said rod and a visual vertical sight line between the outer most tips of the end sections of each said rods and the upper most part of said slide out room, thereby
   i. creating a visual frame of reference wherein said driver can determine without making frequent trips outside said recreational vehicle if any stationary objects exist which would interfere with, or cause damage to, said slide out room when fully extended, or that said room extends beyond or over any boundary, line, or limit imposed by a private or public body.

* * * * *